E. D. ABRAHAM.
BEDPAN.
APPLICATION FILED SEPT. 2, 1919.

1,388,155.

Patented Aug. 23, 1921.

INVENTOR
E. D. Abraham
BY Munn & Co.
ATTORNEYS

UNITED STATES PATENT OFFICE.

EDWIN D. ABRAHAM, OF CHICAGO, ILLINOIS.

BEDPAN.

1,388,155.  Specification of Letters Patent.  Patented Aug. 23, 1921.

Application filed September 2, 1919. Serial No. 321,015.

*To all whom it may concern:*

Be it known that I, EDWIN D. ABRAHAM, a citizen of the United States, and a resident of the city of Chicago, in the county of Cook and State of Illinois, have invented a new and useful Improvement in Bedpans, of which the following is a full, clear, and exact description.

My invention relates to improvements in bed pans and it consists in the combinations, constructions and arrangements herein described and claimed.

An object of my invention is to provide a bed pan which is made more sanitary, owing to the use of a waterproof lining.

A further object of my invention is to provide a sanitary bed pan having a removable waterproof lining, which may be burned.

A further object of my invention is to provide an inexpensive lining or inner receptacle for bed pans which can be made cheaply, which is convenient to handle, and which will render the washing of the bed pan unnecessary.

Other objects and advantages will appear in the following specification, and the novel features of the invention will be particularly pointed out in the appended claims.

My invention is illustrated in the accompanying drawings, forming part of this application, in which—

Figure 1:
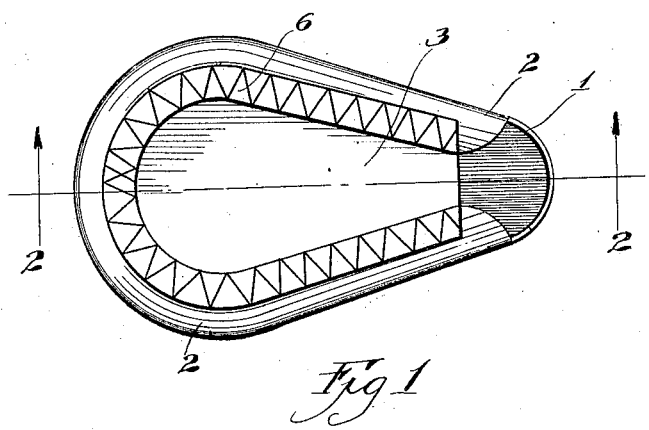
Figure 1 is a plan view.
Figure 2:
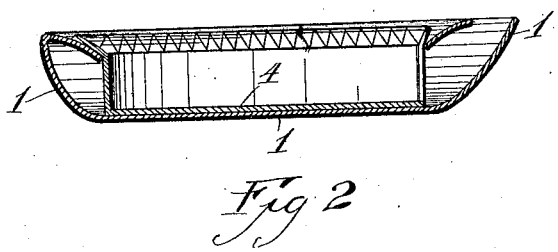
Fig. 2 is a section along the line 2—2 of Fig. 1.
Figure 3:
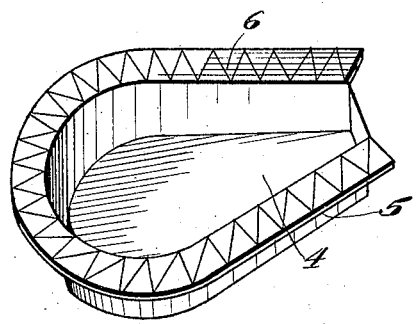
Fig. 3 is a perspective view of the inner pan or lining.

In carrying out my invention, I make use of the conventional form of pan such as that shown in the drawings. This includes the receptacle 1 having an inwardly turned flange 2 at its top, an opening 3 being provided of the customary shape. In Fig. 3 I have shown an inner receptacle or inner lining which is preferably made of vegetable parchment, waxed paper or any other light, suitable, impervious, material. This receptacle consists of a bottom 4 and sides 5, the upper edges of the sides being turned over and crimped to form a stiffening rim 6.

In use, the inner pan or lining is placed in the opening 3 so that the entire surface of the bottom 4 of the inner receptacle will rest on the bottom of the pan 1. The crimped flange 6 of the inner receptacle will overlie and rest upon the upper inturned flange 2 of the bed pan. It will thus be noted that the inner receptacle conforms in outline to the shape of the outer receptacle and fits snugly within the outer receptacle. The inner receptacle so arranged with respect to the outer receptacle is reinforced by the outer receptacle and has substantially the same capacity as the latter.

The defecations will be received in the inner lining or pan, which may be immediately removed and burned, thus keeping the main bed pan clean at all times.

A device such as that described above is particularly useful in hospitals where a number of persons necessarily use a common bed pan. The provision of the outwardly turned crimped flange 6 of the inner lining or pan forms a protecting portion for the main bed pan, while at the same time it affords a handle by means of which the inner pan may be readily removed.

The linings or inner receptacles are relatively inexpensive and their use will greatly add to the maintenance of sanitary conditions.

I claim:

1. A bed pan comprising a substantially oblong outer receptacle tapering at one end and having a substantially flat bottom and side walls extending entirely around the bottom, said receptacle being formed with a flange turned inwardly along the upper edge thereof and extending around the wider end of the receptacle and along the converging sides; thereby providing an opening, and a removable inner receptacle having a body portion inserted through said opening to rest upon the bottom of said outer receptacle, said inner receptacle conforming substantially in outline with said outer receptacle and having its side walls formed with an outwardly turned flange extending along the upper edge thereof, said outwardly turned flange extending entirely around the wider end of the inner receptacle along the converging sides thereof and being arranged to overlie and rest on the inwardly turned flange of said outer receptacle.

2. A bed pan comprising a substantially cordiform shaped outer receptacle having a substantially flat bottom and having side walls extending entirely around said bottom, said outer receptacle being provided with an inturned flange along the upper edge thereof, said flange extending entirely around the wider end of the receptacle and along the side walls thereof to points adjacent the narrower end of said receptacle, thereby providing an opening for the receptacle, and an inner receptacle formed of a light waterproof material and conforming substantially in outline with the outer receptacle, said inner receptacle being adapted to have its body portion inserted through said opening in the outer receptacle until the bottom thereof rests upon the bottom of the outer receptacle and the sides thereof are spaced from the sides of said outer receptacle, said inner receptacle being formed with an outturned flange arranged to overlie and rest on the inturned flange of the outer receptacle, said flange forming a combined stiffening rim and handle portion for said inner receptacle.

EDWIN D. ABRAHAM.